United States Patent [19]

Malwitz

[11] Patent Number: 4,815,651
[45] Date of Patent: Mar. 28, 1989

[54] PROCEDURE FOR ATTACHMENT OF VERTICALLY ORIENTED RIBS ON THE OUTSIDE OF PIPES

[75] Inventor: Eberhard Malwitz, Darmstadt, Fed. Rep. of Germany

[73] Assignee: Gesellschaft für Schwerionenforschung mbH, Darmstadt, Fed. Rep. of Germany

[21] Appl. No.: 112,238

[22] Filed: Oct. 26, 1987

[30] Foreign Application Priority Data

Oct. 24, 1986 [DE] Fed. Rep. of Germany ....... 3636198

[51] Int. Cl.$^4$ .............................................. B23K 31/02
[52] U.S. Cl. .................................. 228/173.2; 228/183; 29/157.3 C
[58] Field of Search ..................... 228/173.2, 183, 218, 228/219, 173.2, 183; 29/157.3 A, 523, 157.3 C

[56] References Cited

U.S. PATENT DOCUMENTS 1,970,481  8/1934  Young et al.
4,570,317  2/1986  Veling et al. ................... 29/157.3 A
4,692,979  9/1987  Pietzcker ........................ 29/157.3 A

FOREIGN PATENT DOCUMENTS 1950471  4/1971  Fed. Rep. of Germany
3033199  3/1981  Fed. Rep. of Germany
1568993  5/1969  France
154454  9/1983  Japan ............................. 228/173.2
1317983  5/1973  United Kingdom
2085785  5/1982  United Kingdom ............ 228/183

OTHER PUBLICATIONS

Vol. 9, No. 326 (M-441) [2049] Dec. 21, 1985.

Primary Examiner—M. Jordan
Attorney, Agent, or Firm—Spencer & Frank

[57] ABSTRACT

A process of attachment of at least one rib on a pipe with a thin wall which comprises cutting a hole in the rib that corresponds closely to the outer diameter of the pipe; locating the rib on the outer surface of the pipe; pressurizing the interior of the pipe with a pressure sufficient to force the outer surface of the pipe into close relationship with the inner contour of the rib during or shortly before reaching the soldering temperature; attaching the rib to the pipe by soldering; and selecting the materials for the rib and pipe so that the linear thermal expansion coefficients allow a smaller gap between the pipe and the rib during soldering than when the pipe and rib are at room temperature.

11 Claims, 2 Drawing Sheets

4,815,651

PROCEDURE FOR ATTACHMENT OF VERTICALLY ORIENTED RIBS ON THE OUTSIDE OF PIPES

BACKGROUND OF THE INVENTION

1. Field of the Invention

The present invention is concerned with a procedure for attaching ribs to pipes which preferably have a cross-section that is not circular in form.

2. Discussion of the Prior Art

The production of, for instance, accelerator jet-pipes with any desired pipe cross-section and a smooth inner surface, which are stable when exposed to atmospheric air pressure despite low weight and thin pipe walls, is a technical problem for the following reasons:

The brazing of stiffening ribs onto the pipes in a brazing furnace under vacuum or inert gas succeeds only if the brazing gap between the stiffening ribs and the pipe is very small at the brazing temperature, i.e., smaller than 0.1 mm. The problem was previously solved by mechanically expanding the pipe by means of a spreading tool locally prior to brazing and thus achieving attachment of the pipe to the ribs. However, a mechanical or hydraulic mechanical spreading tool is a very expensive item. Further, a spreading tool for pipe cross sections other than circular either can only be used with quite considerable effort or cannot be used for this procedure. Also, because of the mechanical spreading which occurs prior to brazing there is no guarantee that the narrow brazing gap is still maintained during brazing. One example of this is caused by the deformation of the pipe during high brazing temperatures.

In order to guarantee success during the brazing of the ribs, the brazing gaps should be kept as small as possible. However, because of procedural constraints, the holes and negative forms on the ribs can be made very exactly but the pipe form and the corresponding positive form can only be made with variations of greater than or equal to 0.1 mm. Furthermore, with the choice of different materials preserving small brazing gaps is difficult to realize. The outer circumference of the jet-pipe body and the circumference of the corresponding opening in the ribs have to be in exact agreement. Mistakes would make attachment of the ribs on the pipe body impossible, and the consequence would be undesired scratch marks into which the soldering material would penetrate and could not be stopped.

For these reasons, on one hand, a large assembly gap prior to brazing and, on the other hand, during the moment of brazing, a brazing gap as small as possible and specifically which is less than or equal to 0.05 mm are desirable.

SUMMARY OF THE INVENTION

It is an object of the present invention to overcome the difficulties of the prior art and provide a procedure for attaching outer ribs to pipes that does not require a spreading tool.

It is a further object of the invention to provide a process by which the gap between the pipe and rib is less than or equal to 0.05 mm during the moment of brazing. It is another object of the invention to provide a process by which ribs can be attached to pipes without denting the pipe wall.

The above and other objects are accomplished by the invention in which a process of attachment of at least one rib on a pipe having a thin wall with an outer surface which comprises providing a rib having an opening delimited by an inner contour; locating the rib on the outer surface of the pipe; pressurizing the interior on the pipe with a pressure sufficient to force the outer surface of the pipe into close relationship with the inner contour of the rib; attaching the rib to the pipe by brazing, the step of attaching includes heating the rib and the pipe to a brazing temperature not later than the step of pressurizing; and selecting materials for the rib and pipe to have linear thermal expansion coefficients such that a relatively small gap exists therebetween at the brazing temperature and a comparatively larger gap exists at room temperature.

The present invention has the task of indicating a procedure by which the required narrow brazing gap can be produced and maintained during brazing so that a proper connection between pipe body and rib is assured without indenting the pipe wall.

BRIEF DESCRIPTION OF THE DRAWINGS

The invention may be better understood by referring to the detailed description of the invention when taken in conjunction with the accompanying drawings in which.

DESCRIPTION OF THE PREFERRED EMBODIMENTS

Figure 1:
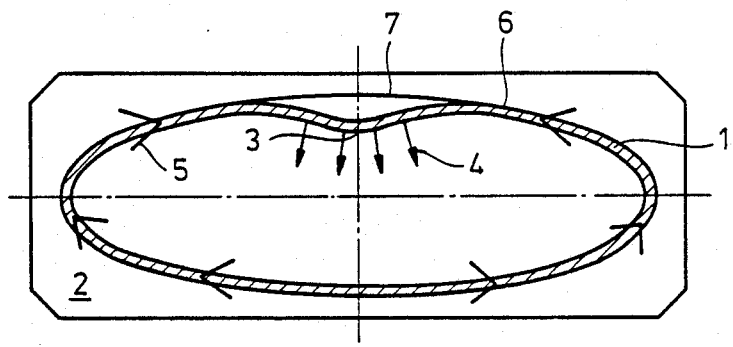
FIG. 1 shows a cross section of a prior art pipe and outside rib with indentation, produced in the customary fashion.

Prior Art FIG. 1 illustrates the indentation 3 of the oval pipe body 1 of a jet pipe for the vacuum operation of UHV. Strengthening or cooling ribs 2 are brazed via their inner contour 7 to the pipe body 1 after a simple insertion process. The kinking in the direction of the arrows 4 is caused by the circumferential tension 5 that results from heating during the brazing. The kinking is favored by certain previous damages, for instance, by indentations or if the brazing gap 6 was chosen too narrow from the start.

Figure 2:
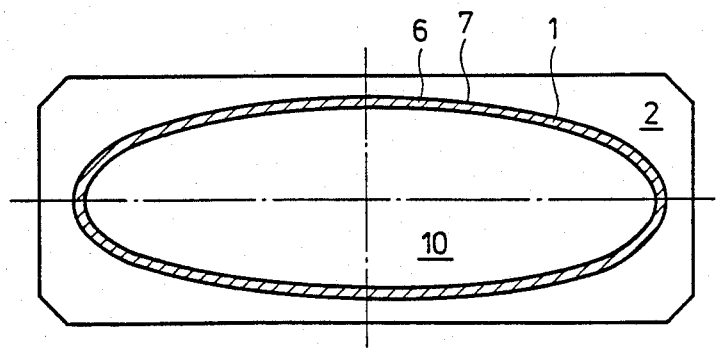
FIG. 2 shows the same cross section of a pipe produced according to the procedure of the present invention.

FIG. 2 shows a proper connection between pipe body 1 and ribs 2. The brazing gap 6 follows the course of the inner contour 7 precisely, and the ribs 2 are brazed onto the body without indentation.

The brazing proceeds as follows: Ribs about 1 mm thick are made from a material such as INCONEL-brand alloys (a group of corrosion-resistant alloys of chromium and nickel) and inserted on the pipe body (which has the following specifications for example: width: 200 mm, height: 70 mm, length: 3,000 mm, material: high-grade steel No. 1.4301). The circumference of the pipe is calculated so that no gap is present between pipe body 1 and ribs 2 at a brazing temperature of 900° C. and thus, at room temperature, the gap becomes as large as possible for purposes of assembling.

Figure 3:
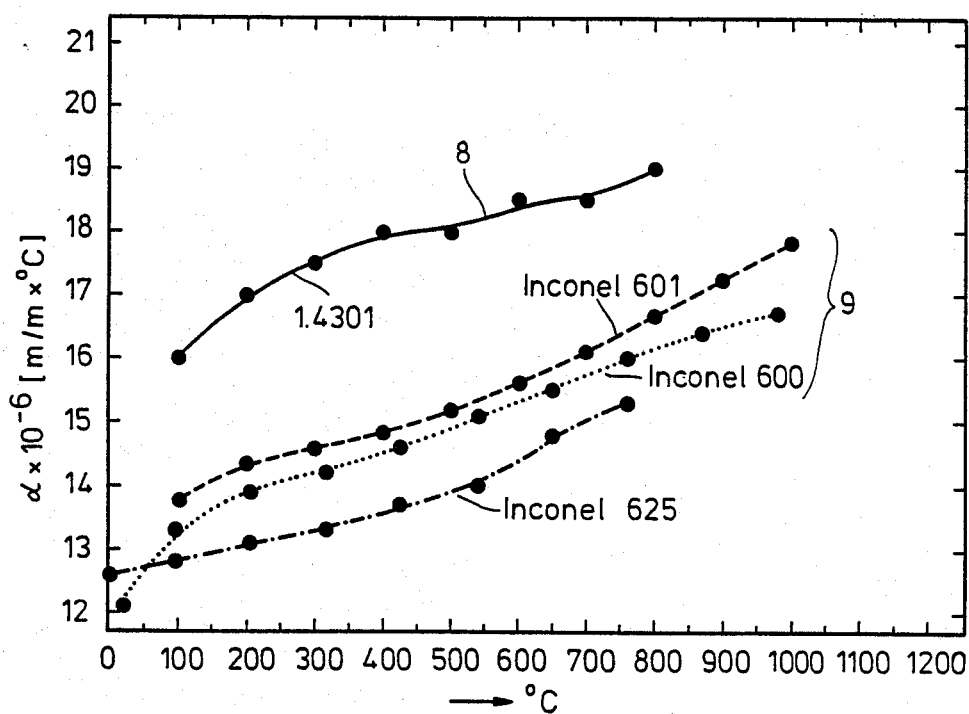
FIG. 3 shows a graph of families of curves of the temperature versus the linear thermal expansion coefficients of materials particularly suited for the procedure.

FIG. 3 shows particularly suited materials for this procedure as families of curves with their linear thermal expansion coefficients. Curve 8 shows the coefficients of the high-grade steel No. 1.4301 and the curves 9 show the corresponding coefficients for INCONEL-brand alloys and specifically INCONEL 600, 601, and 625. It is apparent from Curves 8 and 9 that the respective higher coefficients of high-grade steel (corresponding to Curve 8) relative to the lower ones of INCONEL (Curve 9) favor attachment of the pipe body 1 to the inner contour 7 of the cooling ribs 2. In FIG. 2 the brazing connection between pipe body 1 and ribs 7 is performed with an excess inner pressure between 50 and 300 torr in the pipe interior 10 during brazing in a vacuum furnace. This pressure leads to exact attachment of the outer surface of the pipe body 1 to the inner contour 7. The pressure is maintained until the cooling and solidification, respectively, of the brazing seam. The principal point of the procedure consists in the application of gas pressure for the achievement of narrow soldering gaps on the parts to be brazed. This step is important because the pipes have thin walls which have no structural stability and they otherwise could hardly be kept in place during brazing. For certain pipe cross-sections, the selection of different materials with different thermal expansion coefficients for the pipe and ribs is necessary in order to achieve a narrow brazing gap when reaching brazing temperature. The procedure is particularly characterized by the fact that, during the combination of excessive gas pressure in the pipe and the use of different materials for the components, the play between ribs and pipe can be relatively large prior to permanent attachment of the ribs and that the width of the brazing gap decreases almost to 0 at the brazing temperature because of the different thermal expansion of the material pairing.

The steel No. 1.4301 corresponds to AISI 304 U.S. Standard. INCONEL is a registered trademark of the INCO family of companies.

The composition is:

INCONEL 600

Ni=72–76%
Fe=6–10%
Cr=14–17%

INCONEL 601

Ni=60.5%
Fe=14.1%
Cr=23%
Al=1.4%, impurities 1%

INCONEL 625

Ni=61%
Fe=5%
Cr=20–23%
Mo=8–10%
Nb+Ta=3–4%

The present disclose relates to the subject matter disclosed in German P No. 36 36 198.4 of Oct. 24th, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A process of attachment of at least one rib on a pipe having a thin wall with an outer surface comprising:
    providing a rib having an opening delimited by an inner contour;
    locating the rib on the outer surface of the pipe;
    pressurizing the interior of the pipe with a pressure sufficient to force the outer surface of the pipe into close relationship with the inner contour of the rib;
    attaching the rib to the pipe by brazing said step of attaching including heating the rib and the pipe to a brazing temperature not later than the end of said step of pressurizing;
    the materials for the rib and pipe having different linear thermal expansion coefficients such that a relatively small gap exists therebetween at the brazing temperature and a comparatively larger gap exists at room temperature.

2. A process according to claim 1, wherein the ribs are oriented vertically.

3. A process according to claim 1, wherein the cross-section of the pipe is non-circular.

4. A process according to claim 1, wherein the wall thickness of the pipe is less than or equal to 0.5 mm.

5. A process according to claim 1, wherein the cross-sectional area of the pipe is greater than or equal to 100 cm$^2$.

6. A process according to claim 1, wherein during said step of attaching, the gap between the outer surface of the pipe body and the inner surface of the opening in the rib is less than or equal to 0.05 mm.

7. A process according to claim 1, wherein the pipe body is composed of a high-grade steel.

8. A process according to claim 7, wherein the high-grade steel is material No. 1.4301.

9. A process according to claim 1, wherein the rib is composed of a material which has a composition corresponding to a material selected from the group consisting of INCONEL-brand alloys including INCONEL 600, INCONEL 601, and INCONEL 625.

10. A process according to claim 1, wherein during said step of pressurizing an excessive inner pressure of 50 to 300 torr is maintained at the interior of the pipe body.

11. A process according to claim 1, wherein said step of selecting includes choosing the linear thermal expansion coefficient of the rib so that it is less than the linear thermal expansion coefficient for the pipe.

* * * * *